Figure 1:
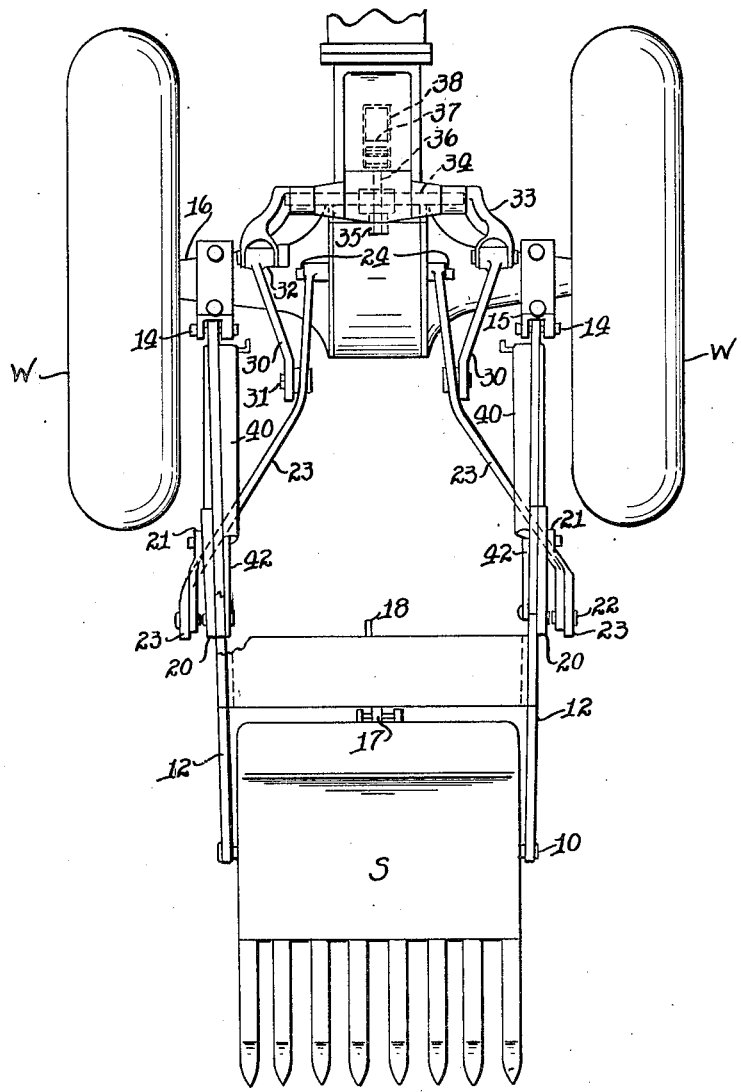

Feb. 27, 1951  V. J. HOLOPAINEN  2,543,496
SHOVEL ATTACHMENT FOR TRACTORS
Filed June 13, 1946  2 Sheets-Sheet 1

INVENTOR.
Vaino J Holopainen.
BY
Chas. T. Hawley ATTY.

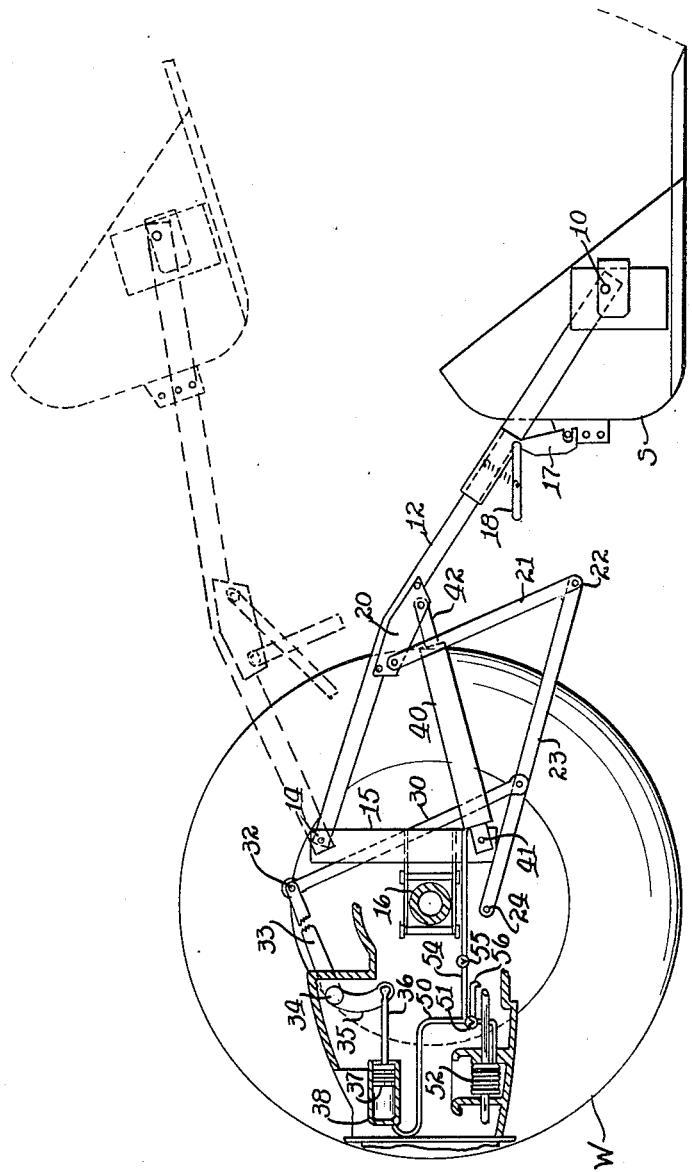

Patented Feb. 27, 1951

2,543,496

UNITED STATES PATENT OFFICE 2,543,496

SHOVEL ATTACHMENT FOR TRACTORS

Vaino J. Holopainen, Hubbardston, Mass., assignor to Wain-Roy Corporation, Hubbardston, Mass., a corporation of Massachusetts Application June 13, 1946, Serial No. 676,486

2 Claims. (Cl. 214—140)

This invention relates to a shovel attachment to be mounted at the rear of a small or farm-type tractor. Such attachments are very useful for light excavating and for loading different kinds of material into a cart or truck. Substantial amounts of material may also be transported short distances in the raised scoop or shovel.

It is the general object of my invention to provide improved lifting means for such a shovel attachment, so designed that the force applied for lifting the load reacts to increase the traction of the rear wheels, instead of tending to raise them from the ground.

To the accomplishment of this general object, I provide lifting cylinders so disposed that a substantial part of the reactive force therein is exerted downward on the rear wheel assembly.

My invention further relates to arrangements and combinations of parts which will be hereinafter described and more particularly pointed out in the appended claims.

A preferred form of the invention is shown in the drawings, in which

Fig. 1 is a plan view of rear portions of a tractor, with my invention applied thereto; and Fig. 2 is a sectional side elevation of the mechanism shown in Fig. 1.

Referring to the drawings, a shovel or scoop S is pivoted at 10 to the rear ends of spaced side bars 12, and the front ends of said bars are pivoted at 14 to the upper ends of brackets 15, adapted to be clamped to the rear axle housing 16 of the tractor. The shovel S may be secured to the bars 12 in different angular positions by a spring latch 17, and may be manually released by raising a handle 18.

The side bars 12 are preferably arched upwardly as shown in Fig. 2, and are provided with plates 20 to which links 21 are pivoted. The lower ends of these links are connected at 22 to a pair of levers 23, which in turn are pivoted at 24 to the rear axle housing of the tractor.

A link 30 is pivoted to each lever 23 at 31, and the upper end of each link 30 is pivoted at 32 to an arm 33 on a cross shaft 34. An additional arm 35 is secured to the cross shaft 34 and is connected by a piston rod 36 to a piston 37 in a hydraulic cylinder 38 forming part of the usual tractor equipment.

As oil under pressure is admitted to the cylinder 38, tension will be applied through the links 30, levers 23 and links 21 to swing the arms 12 and shovel S upward.

Lifting cylinders 40 are pivotally connected to the lower ends of the brackets 15 at points 41 substantially below the axial center of the rear axle housing 16. Piston rods 42 in the cylinders 40 are pivotally connected at their outer ends to the plates 20 previously described.

The cylinder 38 is connected by a pipe 50 and three-way valve 51 to an oil pump 52, from which a supply of oil under pressure is received. A branch pipe 54 connects the pipe 50 to the lower end of each cylinder 40, and a shut-off valve 55 is provided in the pipe 54. The three-way valve 51 may be set to supply oil under pressure to the pipes 50 and 54 or to connect these pipes to a waste pipe 56.

Application of pressure through the pipes 50 and 54 will cause a lifting force to be applied by the piston 37 to the shovel S through the links 30, levers 23 and links 21, and will also cause an additional lifting force to be applied through the cylinders 40 to the pistons 42 which are also connected to lift the shovel.

It will further be noted that the reactive force in each cylinder 40 is directed downwardly and forwardly through the cylinder pivots 41 to the brackets 15 and thence to the rear axle casing 16 and to the rear wheels W. Consequently, the greater the lifting pressure applied to the shovel S, the greater the downward or tractive pressure applied to the wheels W. The traction of the machine is thus increased during the lifting and loading of the shovel, which is the very time at which good traction is necessary to force the shovel rearward into the material to be loaded.

After the shovel has been raised to the horizontal or above, the material may be transported a short distance by the tractor, or the tractor may be operated to swing the load over an adjacent cart or truck where it may be dumped. The three-way valve 51 may be set in neutral position to hold the shovel raised, or the valve 55 may be closed to secure the same result.

All parts of my improved shovel attachment are of ample strength, and the attachment has been found reliable and efficient in actual operation.

Having thus described my invention and the advantages thereof, I do not wish to be limited to the details herein disclosed, otherwise than as set forth in the claims, but what I claim is:

1. A shovel attachment for a tractor comprising a scoop, arms on which said scoop is pivotally mounted, brackets clamped to the rear axle housing and having said arms pivoted to the upper ends thereof, hydraulic means to apply pressure to swing said arms upward, additional hydraulic lifting devices connected at their upper ends to said arms and connected at their lower ends at fixed points on said brackets and substantially below the points of attachment of said arms to said brackets, and means to apply additional hydraulic lifting pressure in said additional hydraulic devices simultaneously with the application of pressure in said first hydraulic means, and both lifting devices being operated throughout the entire lifting stroke.

2. A shovel attachment for a tractor comprising a scoop, arms pivoted at fixed points on said tractor and on which said scoop is pivotally mounted, hydraulic means to apply pressure to swing said arms upward, lifting cylinders additional to said hydraulic means and connected direct to said arms and also connected direct at fixed points on said tractor substantially below the points of pivotal attachment of said arms to said tractor, and a single control means to apply additional hydraulic lifting pressure to said arms by said lifting cylinders simultaneously with the application of pressure to said arms by said hydraulic means and throughout the entire lifting action of said hydraulic means, and said hydraulic means and said lifting cylinder each acting directly to produce a single continuous upward swinging movement of said arms about said fixed points.

VAINO J. HOLOPAINEN.

REFERENCES CITED

The following references are of record in the file of this patent:

UNITED STATES PATENTS

| Number | Name | Date |
|---|---|---|
| 2,001,803 | Stephens | May 21, 1935 |
| 2,362,994 | Frost | Nov. 21, 1944 |
| 2,427,575 | Sedore | Sept. 16, 1947 |
| 2,427,968 | Hoover | Sept. 23, 1947 |